(12) United States Patent
Lydic et al.

(10) Patent No.: US 9,387,864 B2
(45) Date of Patent: Jul. 12, 2016

(54) TRANSVERSE TROUGH COIL CAR WITH MODULAR TROUGH FORMING ASSEMBLIES AND METHOD OF FORMING SAME

(71) Applicant: JAC Operations, Inc., Chicago, IL (US)

(72) Inventors: Todd L Lydic, Johnstown, PA (US); Jeffrey W Boring, Homer City, PA (US)

(73) Assignee: JAC OPERATIONS, INC., Chicago, IL (US)

( * ) Notice: Subject to any disclaimer, the term of this patent is extended or adjusted under 35 U.S.C. 154(b) by 99 days.

(21) Appl. No.: 14/505,069

(22) Filed: Oct. 2, 2014

(65) Prior Publication Data

US 2015/0083020 A1 Mar. 26, 2015

Related U.S. Application Data

(63) Continuation of application No. PCT/US2013/034947, filed on Apr. 2, 2013.

(60) Provisional application No. 61/619,403, filed on Apr. 2, 2012.

(51) Int. Cl.
*B61D 3/00* (2006.01)
*B61D 3/16* (2006.01)
(Continued)

(52) U.S. Cl.
CPC ............... *B61D 3/166* (2013.01); *B60P 3/035* (2013.01); *B60P 7/12* (2013.01); *B61D 3/16* (2013.01); *B61D 45/003* (2013.01); *Y10T 29/49622* (2015.01)

(58) Field of Classification Search
CPC ........ B61D 3/16; B61D 3/166; B61D 45/003; B60P 3/035; B60P 7/12; B61L 27/00; B61L 5/005; B61B 13/12; B61B 3/02
See application file for complete search history.

(56) References Cited

U.S. PATENT DOCUMENTS

| 1,850,597 | A | * | 3/1932 | McGuire | B61D 45/003 410/48 |
| 2,810,602 | A | * | 10/1957 | Abrams | B60P 3/055 105/422 |

(Continued)

FOREIGN PATENT DOCUMENTS

| CN | 201890231 U | 7/2011 |
| RU | 111082 U1 | 6/1998 |

OTHER PUBLICATIONS

United States International Trade Commission, Rolling Stock: Locomotives and Rail Cars, http://www.usitc.gov/publications/332/ITS-08.pdf, Office of Industries Publication ITS-Mar. 8, 2011, Control No. 2011001.

*Primary Examiner* — Jason C Smith
(74) *Attorney, Agent, or Firm* — Blynn L. Shideler; Krisanne Shideler; BLK Law Group

(57) ABSTRACT

A transverse trough coil car includes a plurality of transverse troughs, a pair of trucks, a center sill supported on the trucks, a pair of side walls extending the length of the car coupled to the center sill, and a plurality of trough forming assemblies. Each trough forming assembly includes a center cross bearer member coupled to the side walls and the center sill, a pair of angled floor plates coupled to the side walls, wherein the floor plates form the longitudinally fore and aft sections of adjacent troughs, and a plurality of floor plate supporting gussets extending between the center cross bearer member and the floor plates. A method of forming the transverse trough coil car body is provided for reducing the fabrication costs, inventory costs and assembly time of the car.

20 Claims, 4 Drawing Sheets

(51) Int. Cl.
  *B60P 3/035*   (2006.01)
  *B60P 7/12*    (2006.01)
  *B61D 45/00*   (2006.01)

(56) References Cited

U.S. PATENT DOCUMENTS

| | | | | |
|---|---|---|---|---|
| 3,291,073 A * | 12/1966 | James | B61D 45/008 | 410/49 |
| 3,460,684 A * | 8/1969 | Almasy | B21C 47/24 | 410/121 |
| 3,658,011 A * | 4/1972 | West | B61C 47/24 | 105/96 |
| 3,693,554 A * | 9/1972 | O'Leary | B61D 45/003 | 105/414 |
| 3,715,993 A * | 2/1973 | Orlik | B61D 45/003 | 410/48 |
| 3,922,004 A * | 11/1975 | Chamberlain | B60P 3/035 | 410/49 |
| 4,451,188 A * | 5/1984 | Smith | B61D 45/002 | 410/42 |
| 5,170,717 A * | 12/1992 | Richmond | B61D 3/166 | 105/377.09 |
| 5,191,842 A * | 3/1993 | Tinkler | B61D 3/16 | 105/355 |
| 5,622,116 A * | 4/1997 | Carlton | B60P 3/035 | 105/355 |
| 6,039,284 A * | 3/2000 | Lehrieder | B65H 19/126 | 242/559 |
| 6,176,670 B1 * | 1/2001 | Salsburg | B21C 47/24 | 242/559.4 |
| 6,213,025 B1 * | 4/2001 | Sauerwein | B65G 1/0414 | 104/121 |
| 6,363,864 B1 * | 4/2002 | Jamrozy | B61D 3/16 | 105/355 |
| 6,543,368 B1 * | 4/2003 | Forbes | B61D 45/003 | 105/396 |
| 6,619,213 B2 * | 9/2003 | Militaru | B61D 3/16 | 105/404 |
| 6,749,381 B2 * | 6/2004 | Coslovi | B60P 7/12 | 410/143 |
| 7,232,020 B2 * | 6/2007 | Futschek | B60L 5/005 | 191/10 |
| 7,815,404 B2 * | 10/2010 | DeMent | B60P 7/12 | 410/117 |
| 7,972,098 B2 * | 7/2011 | Dement | B60P 7/0892 | 410/117 |
| 8,033,768 B2 | 10/2011 | Anderson | | |
| 8,672,594 B1 * | 3/2014 | West | B60P 7/12 | 410/100 |
| 2002/0073884 A1 * | 6/2002 | Al-Kaabi | B60P 7/12 | 105/355 |
| 2008/0253854 A1 * | 10/2008 | Anderson | B61D 45/003 | 410/49 |
| 2011/0248141 A1 * | 10/2011 | Lee | B21C 47/00 | 248/346.5 |
| 2012/0187091 A1 * | 7/2012 | Grzyb | B21C 47/24 | 219/69.1 |
| 2012/0317774 A1 * | 12/2012 | Baumer | B21C 47/24 | 29/426.2 |
| 2013/0020179 A1 * | 1/2013 | Holloway | B21C 47/245 | 198/574 |
| 2013/0071223 A1 * | 3/2013 | Cramer | B21C 47/24 | 414/800 |
| 2013/0206923 A1 * | 8/2013 | Gatterbauer | B21C 47/24 | 246/186 |
| 2013/0214078 A1 * | 8/2013 | Jesche | B21C 47/08 | 242/363 |
| 2014/0013995 A1 * | 1/2014 | Kutschera | B60P 3/035 | 105/378 |
| 2015/0083020 A1 * | 3/2015 | Lydic | B60P 3/035 | 105/355 |

* cited by examiner

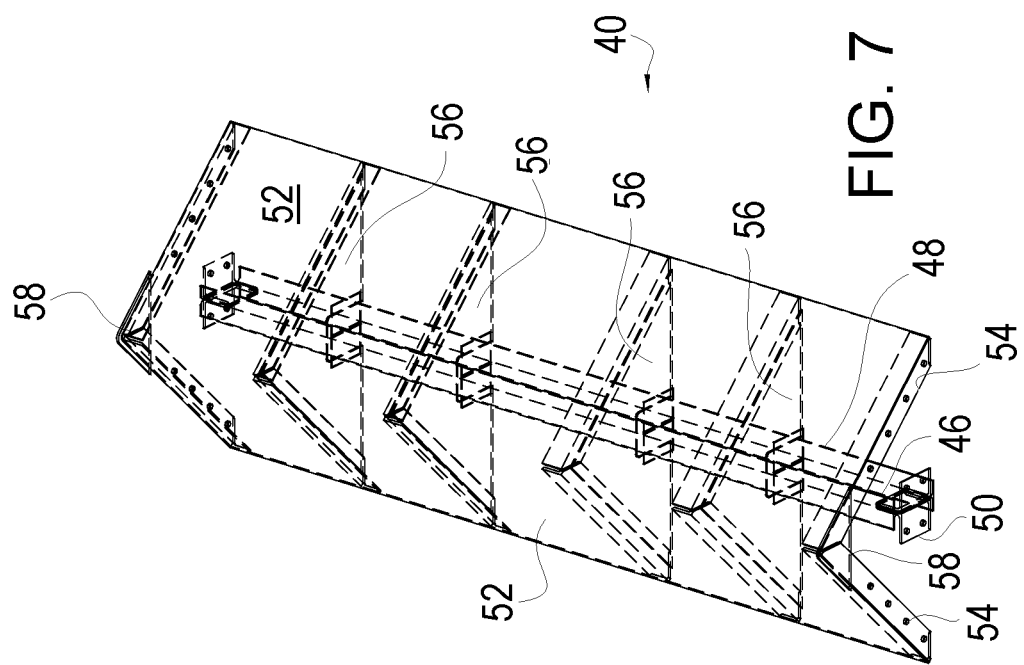

TRANSVERSE TROUGH COIL CAR WITH MODULAR TROUGH FORMING ASSEMBLIES AND METHOD OF FORMING SAME

The present application is a continuation of international application serial number PCT/US13/34947 filed on Apr. 2, 2013 entitled "Transverse Trough Coil Railcars with Modular Trough Forming Assemblies and Method of Forming Same" and which published on Apr. 2, 2013 as WO-2013-151996, which publication is incorporated herein by reference.

International application serial number PCT/US13/34947 claims the benefit of U.S. Provisional Patent Application Ser. No. 61/619,403 filed Apr. 2, 2012 entitled "Transverse Trough Coil Railcars with Modular Trough Forming Assemblies and Method of Forming Same."

FIELD OF THE INVENTION

The present invention relates to transverse trough coil railcars with modular trough forming assemblies and methods of forming same.

BACKGROUND OF THE INVENTION

Freight railroad cars are critical to the economic well-being and global competitiveness of any industrialized country. For example, freight railroad cars move an estimated 42 percent of the United State's freight (measured in ton-miles) more than any other mode of transportation. Essentially all goods are shipped by rail—everything from lumber to vegetables, coal to orange juice, grain to automobiles, and chemicals to scrap iron. Freight carrying railcars connect businesses with each other across most countries and connect business within such countries with outside markets.

Rail provides major advantages in energy efficiency over other modes. On average, railroads are three times more fuel efficient than trucks. Railroads are environmentally friendly as the U.S. Environmental Protection Agency (EPA) estimates that for every ton-mile, a typical truck emits roughly three times more nitrogen oxides and particulates than a locomotive. Other studies suggest trucks emit six to 12 times more pollutants per ton-mile than do railroads, depending on the pollutant measured. Railroads also have a clear advantage in terms of greenhouse gas emissions. According to the Environmental Protection Agency (EPA), railroads account for just 9 percent of total transportation-related NOx emissions and 4 percent of transportation-related particulate emissions, even though they account for 42 percent of the nation's intercity freight ton-miles.

Further, freight railroads significantly alleviate highway congestion. A single intermodal train takes up to 280 trucks (equivalent to more than 1,100 cars) off associated highways; a train carrying other types of freight takes up to 500 trucks off the associated highways. It has been noted that overcrowded highways act as an "inefficiency tax" on our economy, seriously constraining economic growth. Freight railroads help relieve this restriction by reducing gridlock, enhancing mobility, and reducing the pressure to build costly new highways.

Finally, railroads have major safety advantages over other modes. For example, railroads are the safest way to transport hazardous materials. In the United States, railroads and trucks carry roughly equal hazmat ton-mileage, but trucks have nearly 16 times more hazmat releases than railroads. Thus there is a need to continue to improve and revitalize the freight car industry.

Focusing on improving the manufacturing process and car design and assembly can decrease associated costs and assembly time. It has been reported by the Highland Group that the implementation of lean manufacturing techniques and just in time inventory procedures to a railcar fabrication center was able to increase production at the facility of about 50%. This increase in efficiency can be further enhanced or supplemented with improved product design that attempt to maximize efficiency without altering railcar capacity or operation.

Coil cars are a specialized type of railcars, or rolling stock designed primarily for the transport of coils (i.e., rolls) of sheet metal, most commonly steel coils. For an overview of all freight car developments within the United States and associated industry trends see United States International Trade Commission 2011 report on Rolling Stock: Locomotives and Rail Cars (see http://www.usitc.gov/publications/332/ITS-08.pdf). Coil cars are often are considered a subtype of the gondola car, though coil cars bear little resemblance to a typical gondola. A gondola is generally an open-top type of rolling stock that is typically used for carrying loose bulk materials, while coil cars carry items such as plates or coils, or bulky items such as prefabricated pieces of rail track.

Prior to the development, and wide adoption, of coil cars, coils of sheet steel were carried on end or in cradles in open or covered gondolas. Load shifting, damage, and awkward loading and unloading were all problems with this type of loading, and since so much sheet steel is transported, a specialized car was designed for this use.

The body of a coil car consists of at least one trough, or a series of troughs, and may be lined with wood or other material to cushion the carried coils. The coils are set on their sides and supported by the sides forming the trough, and stops may be applied to keep the coils from shifting. Often the trough or pair of troughs are positioned longitudinal relative to the railcar as shown, for example, in U.S. Pat. Nos. 4,451,188 and 6,543,368, which are incorporated herein by reference.

The longitudinal placement of the troughs in a coil car can mean that the coils can be shifted in the trough due to the acceleration and deceleration and impact forces exerted due to the car motion along the track. Thus, in some instances, the coils are carried with their axes transverse to the direction of travel of the car. Representative examples of this construction include U.S. Pat. No. 1,850,597; U.S. Pat. No. 3,291,073 showing a coil skid design; U.S. Pat. No. 3,693,554 discloses a rail flat car with a plurality of transverse bulkheads; and U.S. Pat. No. 3,715,993 in which the cylindrical objects are cable reels. These patents are also incorporated herein by reference. Transverse coil cars typically have a number of parallel troughs, rather than one or two long trough(s). Each trough is generally V-shaped, and the coil sits in the transverse trough with the outer circumference of the coil tangent to the V at two points such that it cannot roll. The V-shaped troughs are generally lined, such as with wood decking to act as cushioning, thereby discouraging damage to the coils during loading or travel.

U.S. Pat. No. 2,810,602 discloses a trailer vehicle body which includes transverse laden supports and is also of general interest to the present invention.

FIG. 1 is a sectional side view of a conventional or prior art transverse coil car 10. This railcar 10 includes an open top body 12 on a pair of spaced trucks 14. As illustrated in this figures the body includes a center sill, pair of side sills, pair of top chords, a pair of side walls extending between each top chord and an associated side sill. The body in this example includes nine transverse troughs 16 that are each designed around a specific range of coils 18.

One difficulty with the illustrated construction of FIG. 1 is that a new car design must be developed essentially from scratch for changes in trough number or size. Traditionally traverse trough coil cars 10 are designed with a specific number of trough pockets 16 and each trough pocket configured to a particular minimum and maximum coil 18 diameter ranges. These troughs 16 on a coil car 10 often are configured with several different coil 18 diameter ranges often to maximize the efficiency of the associated design, and typically the resulting car 10 is associated with a specific custom design and results in many specialized parts for construction of the car 10. The design of the custom parts and fixtures adds to the design time and the fabrication time associated with the car design.

There remains a need in the industry to provide car designers with modular assemblies allowing new car designs to be easily implemented saving both design and manufacturing time and money.

SUMMARY OF THE INVENTION

The present invention is directed to a transverse trough coil car which includes a plurality of transverse troughs along the car body. The car includes a pair of trucks, a center sill supported on the trucks and extending substantially the longitudinal length of the car, a pair of side walls extending the longitudinal length of the car on opposed sides of the car and coupled to the center sill, each side wall including a side sill, top chord and side plate extending between the top chord and the side sill, and a plurality of trough forming assemblies. Each trough forming assembly includes a center cross bearer member extending between and coupled to the side walls and coupled to the center sill, a pair of angled floor plates extending between and coupled to the side walls, wherein the angled floor plates of each trough forming assembly form the longitudinally fore and aft angled sections of adjacent troughs, and a plurality of floor plate supporting gussets extending between the center cross bearer member and the pair of angled floor plates.

A method of forming the transverse trough coil car body is provided for reducing the fabrication costs, inventory costs and assembly time of the car.

These and other advantages of the present invention will be described in connection with that attached figures in which like reference numeral represent like elements throughout.

BRIEF DESCRIPTION OF THE DRAWINGS

For a better understanding of the present invention and to show more clearly how it may be carried into effect, reference will now be made by way of example to the accompanying drawings, which show an apparatus according to the preferred embodiment of the present invention and in which:

FIG. 7 is a top perspective view of a modular trough forming assembly of FIG. 4 with the internal support gussets shown in phantom.

DETAILED DESCRIPTION OF THE INVENTION

Figure 1:
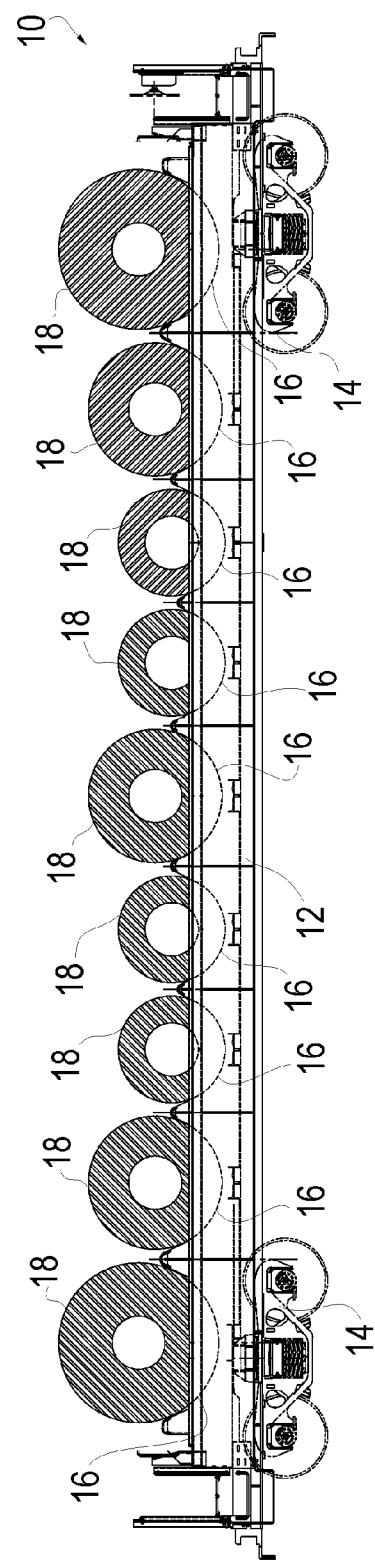
FIG. 1 is a sectional side view of a prior art transverse coil car.
Figure 2:
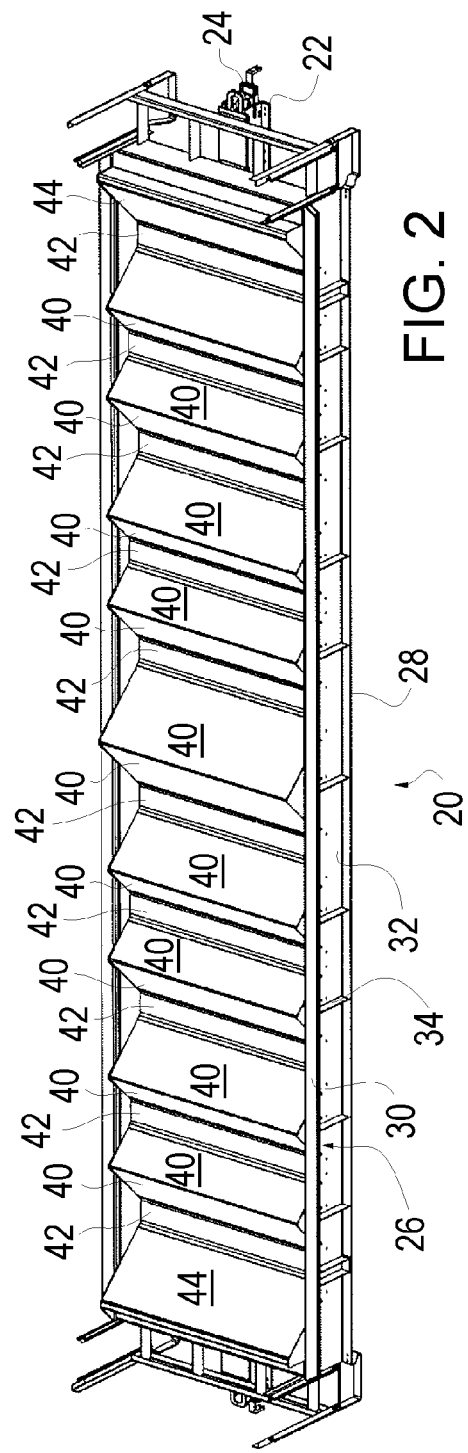
FIG. 2 is a top perspective view of a transverse trough coil railcar body with modular trough forming assemblies in accordance with one aspect of the present invention.
Figure 4:
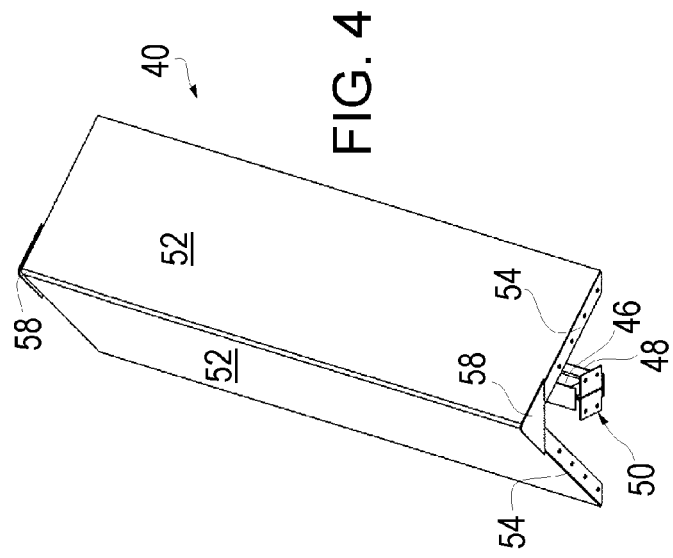
FIG. 4 is a top perspective view of a modular trough forming assembly of the railcar of FIG. 2 with an end gusset removed for clarity.
Figure 6:
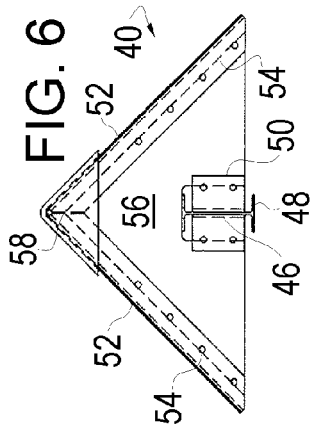
FIG. 6 is an end elevation view of the modular trough forming assembly of FIG. 4.
Figure 5:
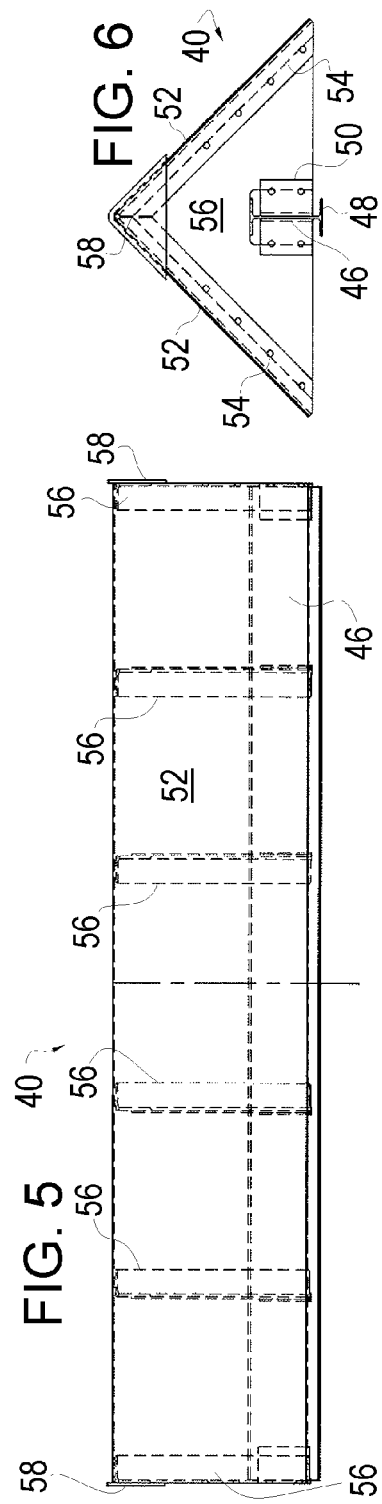
FIG. 5 is a side elevation view of the modular trough forming assembly of FIG. 4.

FIG. 2 is a top perspective view of a transverse trough coil railcar body 20 with modular trough forming assemblies 40 in accordance with one aspect of the present invention. The railcar of the invention includes an under-frame having a conventional center sill 22 supported on a conventional pair of spaced trucks 14 (shown in FIG. 1) and extending substantially the longitudinal length of the car body 20. It is also known to have two railcar bodies share three trucks, or even four railcar bodies share five trucks and the body 20 and trucks 14 could be formed similarly, however even in these arrangements each single body 20 is associated with a given pair of trucks 14.

A truck 14 (also known as bogies), in railroading, references the railroad car wheel assembly usually having two or more axels and which typically rotate freely beneath the cars in order to allow the cars to navigate turns.

The center sill 22 is generally a box shaped in cross-section and may be considered the main structural member of the railcar. The center sill 22 runs from one end coupling 24 (also known as couplers) of the car to the other. The center sill 22 is the primary load path of the car both for longitudinal buff and draft loads from coupler to coupler, and for carrying the vertical load bending moment between the trucks. See examples in U.S. Pat. Nos. 7,861,659; 6,119,345; 5,860,366; 4,565,135; 4,493,266 and 4,194,451 which are incorporated herein by reference.

The transverse trough coil railcar body 20 includes a pair of side walls 26 extending the longitudinal length of the car body 20 on opposed sides of the car, each side wall 26 including a side sill 28, top chord 30, and side plates 32 extending between the top chord 30 and the side sill 28. Side stakes 34 may be provided to further support the side plate 32.

The side plate 32 may be formed of a number of distinct plate members as needed. The construction of the side walls is generally known in the art as is the end construction and intermediate cross supports (not shown) coupling the side sills 28 of the side walls 26 to the center sill 22. The top chords 30 and side sills 28 may be open or closed structural members and may be formed as composite members as known in the art.

A significant aspect of the present invention is the inclusion of a plurality of trough forming assemblies 40 in the car, such as the nine shown in the illustrated embodiment of the present invention and shown in detail individually in FIGS. 4-7.

The use of the modular trough forming assemblies 40 in the car provide for substantially reducing the fabrication costs, inventory costs and assembly time for each distinct car design. The modular trough forming assemblies 40 can be used to form essentially any desired transverse trough.

Increasing or decreasing the lateral distance between adjacent trough forming assemblies 40 creates larger or smaller pockets 42 without requiring specialized components or requiring customized parts. A pair of adjacent trough forming assemblies 40 forms a pocket 42 or trough. The leading and trailing (or fore-most and aft-most) troughs 42 are formed by the cooperation of the leading or trailing trough forming assembly 42 and an adjacent angled floor plate 44 on the end structure of the car.

Figure 3:
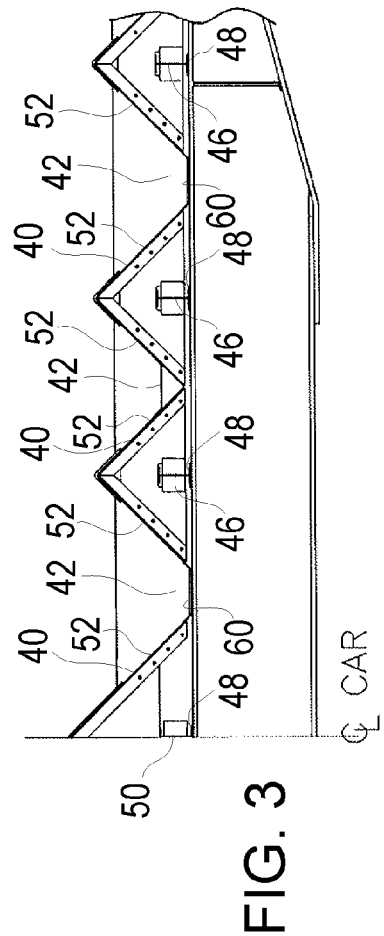
FIG. 3 is a elevation section view of a portion of the transverse trough coil railcar body of FIG. 2.

Each trough forming assembly 40 includes a center cross bearer member 46 extending between and coupled to the side walls 26 and coupled to the center sill 22 as shown in FIG. 3.

A filler plate 48 may be provided to assist in coupling, such as through welding, of the center cross bearer member 46 to the center sill 22.

In each trough forming assembly 40, the center cross bearer member 46 and filler plate may be formed as an I-beam extending across the car body. The center cross bearer member 46 may include a pair of flat plates 50 at opposed side ends of the I-beam for coupling the center cross bearer member 46 to the adjacent side wall 26. The transverse trough assembly center cross bearer member 46 may be welded to each side wall 26 or may, preferably, be bolted to each side wall 26.

The design of the trough forming assembly 40, in particular, and the bolting to the sidewall 26 to a lesser extent, allows for a distinct car to be easily converted in use to alternative trough configurations to accommodate other designated uses without substantial retrofitting of the car design.

Each trough forming assembly 40 includes a pair of angled floor plates 52 extending between and coupled to the side walls 26, wherein the angled floor plates 52 of each trough forming assembly 40 form the longitudinally fore and aft angled sections of adjacent troughs 42. The pair of angled floor plates 52 may be welded or bolted to the sidewalls 26 through floor reinforcement to side connection members 54 at the side ends of the floor plates 52.

Each trough forming assembly 40 includes a plurality of floor plate supporting gussets 56 extending between the center cross bearer member 46 and the pair of angled floor plates 52 and acting as floor reinforcements.

The plurality of floor plate supporting gussets 56 may be formed as triangular plates positioned substantially parallel to each other and with a longitudinal axis of the car body. The outermost gusset 56 can further act as a tie plate for coupling the trough forming assembly to the side wall 26.

The transverse trough coil car body 20 according to the present invention may further include end cap members 58 at the side ends of each trough forming assembly 40 at the apex of the floor plates 52.

The transverse trough coil car body 20 according to the present invention may further include trough floor pans 60 extending between adjacent trough forming assemblies to complete the trough sections.

The troughs may include other coil engaging structure (not shown) such as wood supports to protect the coils and car cover structures over the car body, which also protect the coils.

A preferred embodiment has been described in detail and a number of alternatives have been considered. As changes in or additions to the above described embodiments may be made without departing from the nature, spirit or scope of the invention, the invention is not to be limited by or to those details, but only by the appended claims and equivalents thereto.

What is claimed is:

1. A transverse trough coil car body including a plurality of transverse troughs along the car body, comprising:
   a center sill extending substantially the longitudinal length of the car body;
   a pair of side walls extending the longitudinal length of the car body on opposed sides of the car, each side wall including a side sill, top chord and side plate extending between the top chord and the side sill; and
   a plurality of trough forming assemblies, each trough forming assembly including a center cross bearer member extending between and coupled to the side walls and coupled to the center sill, a pair of angled floor plates extending between and coupled to the side walls, wherein the angled floor plates of each trough forming assembly form the longitudinally fore and aft angled sections of adjacent troughs, and a plurality of floor plate supporting gussets extending between the center cross bearer member and the pair of angled floor plates.

2. The transverse trough coil car body according to claim 1 wherein in each trough forming assembly the plurality of floor plate supporting gussets are triangular plates positioned substantially parallel to each other and with a longitudinal axis of the car body.

3. The transverse trough coil car body according to claim 1 wherein in each trough forming assembly the center cross bearer member includes an I-beam extending across the car body.

4. The transverse trough coil car body according to claim 3 wherein in each trough forming assembly the center cross bearer member includes a pair of flat plates at opposed ends of the I-beam for coupling the center cross bearer member to the adjacent side wall.

5. The transverse trough coil car body according to claim 4 wherein in each trough forming assembly the center cross bearer member is bolted to each side wall.

6. The transverse trough coil car body according to claim 1 wherein in each trough forming assembly each floor plate is bolted to each side wall at opposed ends thereof.

7. The transverse trough coil car body according to claim 1 further including at least one trough floor pan extending between adjacent trough forming assemblies.

8. A transverse trough coil car including a plurality of transverse troughs along the car body, comprising:
   a pair of trucks;
   a center sill supported on the trucks and extending substantially the longitudinal length of the car;
   a pair of side walls extending the longitudinal length of the car on opposed sides of the car and coupled to the center sill, each side wall including a side sill, top chord and side plate extending between the top chord and the side sill; and
   a plurality of trough forming assemblies, each trough forming assembly including a center cross bearer member extending between and coupled to the side walls and coupled to the center sill, a pair of angled floor plates extending between and coupled to the side walls, wherein the angled floor plates of each trough forming assembly form the longitudinally fore and aft angled sections of adjacent troughs, and a plurality of floor plate supporting gussets extending between the center cross bearer member and the pair of angled floor plates.

9. The transverse trough coil car according to claim 8 wherein in each trough forming assembly the plurality of floor plate supporting gussets are triangular plates positioned substantially parallel to each other and with a longitudinal axis of the car.

10. The transverse trough coil car according to claim 8 wherein in each trough forming assembly the center cross bearer member includes an I-beam extending across the car.

11. The transverse trough coil car according to claim 10 wherein in each trough forming assembly the center cross bearer member includes a pair of flat plates at opposed ends of the I-beam for coupling the center cross bearer member to the adjacent side wall.

12. The transverse trough coil car according to claim 11 wherein in each trough forming assembly the center cross bearer member is bolted to each side wall.

13. The transverse trough coil car according to claim 8 wherein in each trough forming assembly each floor plate is bolted to each side wall at opposed ends thereof.

14. The transverse trough coil car according to claim 8 further including at least one trough floor pan extending between adjacent trough forming assemblies.

15. A method of forming transverse trough coil car body including a plurality of transverse troughs along the car body for reducing the fabrication costs, inventory costs and assembly time comprising the steps of:
Providing a center sill extending substantially the longitudinal length of the car body, a pair of side walls extending the longitudinal length of the car body on opposed sides of the car, each side wall including a side sill, top chord and side plate extending between the top chord and the side sill; and
Designing and utilizing a plurality of trough forming assemblies, each trough forming assembly including a center cross bearer member extending between and coupled to the side walls and coupled to the center sill, a pair of angled floor plates extending between and coupled to the side walls, wherein the angled floor plates of each trough forming assembly form the longitudinally fore and aft angled sections of adjacent troughs, and a plurality of floor plate supporting gussets extending between the center cross bearer member and the pair of angled floor plates.

16. The method of forming a transverse trough coil car body according to claim 15 wherein in each trough forming assembly the plurality of floor plate supporting gussets are triangular plates positioned substantially parallel to each other and with a longitudinal axis of the car.

17. The method of forming a transverse trough coil car body according to claim 15 wherein in each trough forming assembly the center cross bearer member includes an I-beam extending across the car.

18. The method of forming a transverse trough coil car body according to claim 17 wherein in each trough forming assembly the center cross bearer member includes a pair of flat plates at opposed ends of the I-beam for coupling the center cross bearer member to the adjacent side wall.

19. The method of forming a transverse trough coil car body according to claim 18 wherein in each trough forming assembly the center cross bearer member is bolted to each side wall.

20. The method of forming a transverse trough coil car body according to claim 18 wherein in each trough forming assembly each floor plate is bolted to each side wall at opposed ends thereof.

* * * * *